I. HULTMAN.
CHUCK.
APPLICATION FILED OCT. 13, 1919.
1,379,986.
Patented May 31, 1921.
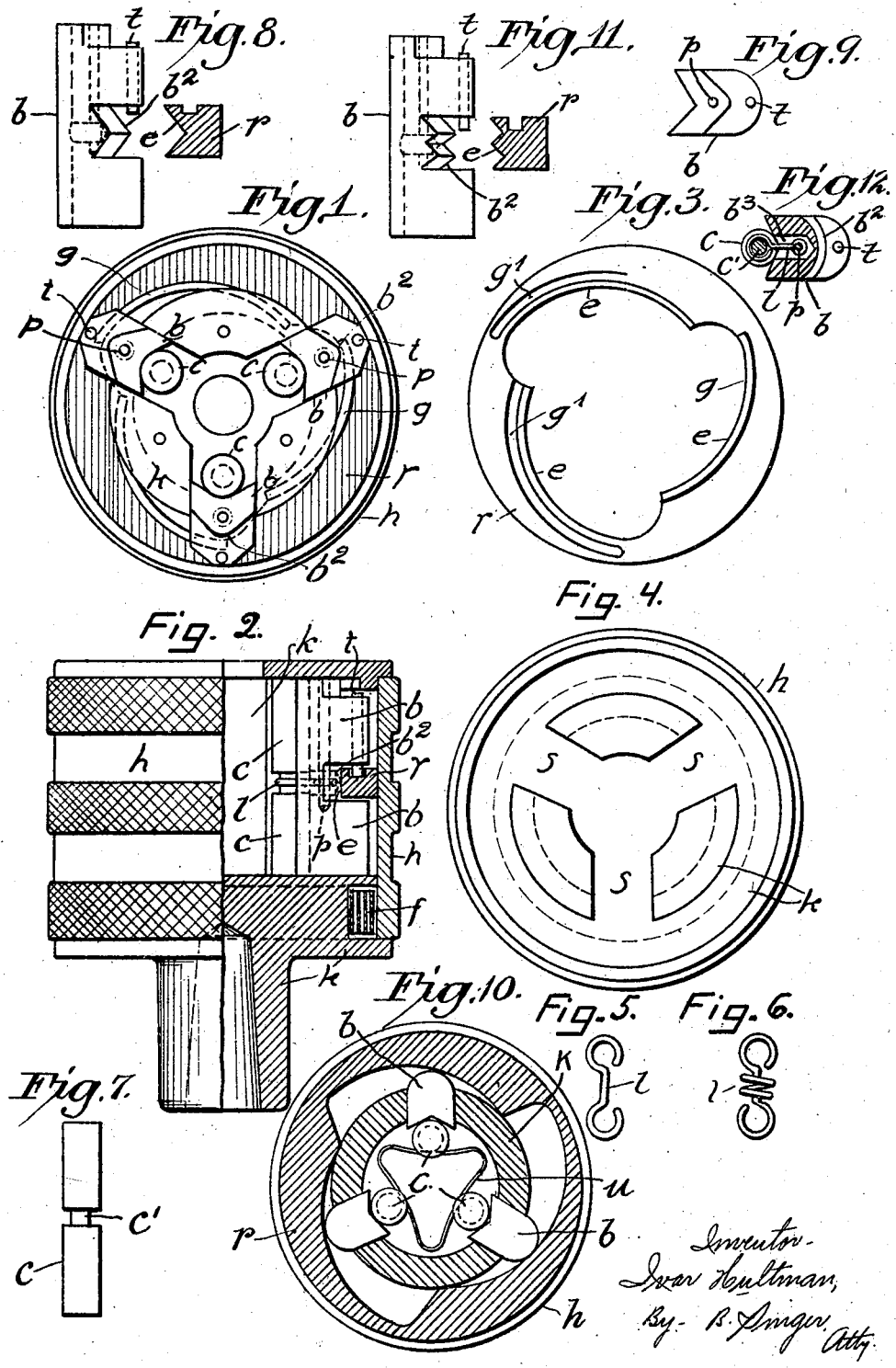

UNITED STATES PATENT OFFICE.

IVAR HULTMAN, OF SALTSJÖBADEN, NEAR STOCKHOLM, SWEDEN.

CHUCK.

1,379,986.   Specification of Letters Patent.   Patented May 31, 1921.

Application filed October 13, 1919. Serial No. 330,419.

*To all whom it may concern:*

Be it known that I, IVAR HULTMAN, a subject of the King of Sweden, residing at Neglinge, Saltsjöbaden, near Stockholm, in the Kingdom of Sweden, have invented a new and useful Chuck, of which the following is a specification.

The invention refers to an automatically gripping and centering lathe-chuck or drill socket which also may be used as a shaft-coupling or the like. The three jaws (either slidable or swingable) generally used in chucks of this type coöperate with the usual eccentric faces made on a loose ring or sleeve which is turned by spring power so as to force the jaws inward and cause them to grip and hold the object (for instance a bore) inserted between them. When the bore is caught by the jaws, it is firmly jammed by separate rolling or tipping members which are connected to the jaws and operate automatically in such a way, that the jamming power is increased in proportion to the resistance exerted on the bore (by a piece of work).

The chief object of the invention is to so construct the elements of the chuck and to so dispose the jamming members that they operate to firmly hold the bore not only when the chuck rotates forward but also when it rotates backward so that chucks of this type can be used also for screw-taps and other objects which must be turned in both directions.

The eccentric faces of the spring-actuated ring or sleeve which operate as usual in one direction only, are still adapted to keep the bore in position when the chuck rotates backward. The spring which actuates the sleeve will always tend to jam the bore independently of the direction in which the chuck rotates. The operation of this spring is not disturbed by the reverse movement of the chuck. It will thus even then cause the jaws to grip and hold the bore with the same effect.

In the accompanying drawings:—

Figure 1 is an end elevation of a chuck constructed and arranged in accordance with my invention, and with one end of the body removed.

Fig. 2 is partly a side elevation of the same, and partly a transverse section.

Fig. 3 is a detail elevation of the ring, showing one construction thereof at the right hand side of said figure and a modified construction thereof at the left hand side of said figure.

Fig. 4 is a detail elevation of the body and sleeve.

Fig. 5 is a detail elevation of one of the springs which retains the rollers in place.

Fig. 6 is a similar view, showing a modification of the spring.

Fig. 7 is a detail plan of one of the rollers.

Fig. 8 is a detail plan of one of the jaws and a detail transverse section of the ring, showing the jaw removed from the ring.

Fig. 9 is a detail end elevation of the jaw shown in Fig. 8.

Fig. 10 is a transverse sectional view of a chuck constructed in accordance with a modification of my invention.

Fig. 11 is a detail plan of a modified form of the jaw shown in Fig. 8, and a detail transverse sectional view of the ring, showing the jaw detached from the ring.

Fig. 12 is a detail transverse sectional view of the jaw shown in Fig. 11.

In the form of the invention shown in Figs. 1 and 4 the body $k$ has three radial slots $s$ for the jaws $b$. In the sleeve $h$, which is loose on body $k$, a ring $r$ (Fig. 3) is fastened. This ring has three eccentric inner faces $e$ which touch the outer ends of the jaws, means being provided for keeping the jaws in contact with said faces, so that the jaws are forced inward when the sleeve is turned on the body $k$ in one direction and drawn outward when the sleeve is turned on said body in a reverse direction. In the example this means consists of ribs $g$ formed on the upper side of the ring along and adjacent to the faces $e$, or of slots $g^1$ concentric with said faces. In Fig. 3 the left half shows an example with slots and the right half an example with ribs. The ribs and slots engage a vertical pin $t$ fixed in each jaw at a short distance from the face $b^2$ (Figs. 8 and 11), which coöperates with face $e$.

The spring $f$ (Fig. 2) fixed to body $k$ and sleeve $h$ tends to turn the sleeve on the body so as to force the jaws inward. By turning the sleeve by hand in reverse direction the jaws are drawn outward.

The ring $r$, which may be integral with the sleeve $h$, if preferred, is preferably so disposed, that it operates on the middle portion of the jaws.

In order to afford sufficient friction between the ring and the jaws the coöperating faces $b^2$ and $e$ may be corrugated or otherwise so shaped that the contact area becomes large. In Figs. 8 and 11 I have shown these faces beveled or wedge like. Hence the maximum degree of thickness is secured between the faces of the ring and jaw, slipping is prevented, and the chuck is adapted to fit a larger bore than would otherwise be the case.

The inner face of each jaw, id est the face which is adjacent to the bore, is concave (cylindric or prismatic or the like) and symmetric with regard to a longitudinal plane which coincides with the axis of rotation of the chuck and with the middle radial plane of the jaw.

On this concave face works a loose roller $c$ (Fig. 7) or the like, which by any suitable means should be connected to the jaw so as to partake in its inward and outward movement. In the example this means consists of a link $l$ (Fig. 5) with an eye at each end. One of these eyes embraces a neck $c^1$ on the roller and the other a pin $p$ passed in a vertical bore in the jaw which bore communicates with an opening $b^3$ (Fig. 12) on the inner concave face of the jaw through which opening the outer end of the link is passed. The eyes or one of them is a little wider than the neck or pin so as to allow a little movement of the roller toward both sides from the symmetric intermediate position. Fig. 6 shows a link with spring middle portion which allows such movement without the use of larger eyes.

When inserting a bore (or other object) into the chuck, the sleeve should be turned by hand against the strain of the spring $f$ so as to move the jaws apart. By releasing the sleeve the spring turns it in the other direction until the rollers touch the bore and hold it in position. When the chuck and with it the bore is then rotated in one direction or the other and the bore is working on a stationary piece, the resistance exerted by this piece will tend to hold the bore stationary and prevent its rotation. The friction thereby caused between the bore and the rollers will force the rollers to roll a little from the symmetric position, and this movement, though very small, will bring the rollers a trifle nearer each other, so as to jam the bore with increased power, thus forcing it to partake in the rotation of the chuck. The slope of the faces of the jaws on which the rollers move should be so measured that the rollers are prevented from sliding on them. As these two faces on each jaw are symmetric, id est, have the same slope though in different directions, it is obvious that the same operation will take place whether the chuck rotates in forward or backward direction.

If the rollers are kept in normal position by a spring $u$ (Fig. 10), the links $l$, pins $p$ and guides $g$, $g^1$ may be dispensed with.

In Fig. 1 the part of ring $r$ not covered by body $k$ is shaded (except the guide $g$). In Fig. 10 the ring $r$ and the parts of body $k$, which guide the jaws, are shaded.

What I claim is:

1. In a chuck, the combination of a circular body, a sleeve arranged to turn on the body and having cam faces on its inner side; jaws bearing on said cam faces, and mounted for movement toward and from the center of the body, and to turn therewith, each jaw having the face which is presented toward the center of the body provided with oppositely inclined diverging cam surfaces; work engaging rollers mounted in said faces of the jaws; and a spring arranged to turn the sleeve on the body in the required direction to cause its cam faces to move the jaws and rollers toward the center of the body.

2. In a chuck, the combination of a circular body, a sleeve arranged to turn on the body and having cam faces on its inner side, jaws bearing on said cam faces, and mounted for movement toward and from the center of the body and to turn therewith, each jaw having the face which is presented toward the center of the body provided with oppositely inclined diverging cam surfaces, work engaging rollers mounted in said faces of the jaws, and yieldable means to hold said rollers in place and permit said rollers to roll on said oppositely inclined diverging cam surfaces.

IVAR HULTMAN.

Witnesses:
L. ROMELL,
NILS LUNDBERG.